United States Patent
Vartiainen et al.

(10) Patent No.: US 11,086,065 B2
(45) Date of Patent: Aug. 10, 2021

(54) DIFFRACTIVE GRATING WITH VARIABLE DIFFRACTION EFFICIENCY AND METHOD FOR DISPLAYING AN IMAGE

(71) Applicant: Dispelix Oy, Espoo (FI)

(72) Inventors: Ismo Vartiainen, Espoo (FI); Juuso Olkkonen, Espoo (FI); Jussi Rahomäki, Espoo (FI)

(73) Assignee: Dispelix Oy, Espoo (FI)

(*) Notice: Subject to any disclaimer, the term of this patent is extended or adjusted under 35 U.S.C. 154(b) by 0 days.

(21) Appl. No.: 16/611,862

(22) PCT Filed: May 8, 2018

(86) PCT No.: PCT/FI2018/050340
§ 371 (c)(1),
(2) Date: Nov. 8, 2019

(87) PCT Pub. No.: WO2018/206847
PCT Pub. Date: Nov. 15, 2018

(65) Prior Publication Data
US 2020/0166691 A1    May 28, 2020

(30) Foreign Application Priority Data
May 8, 2017    (FI) ................................. 20175412

(51) Int. Cl.
*F21V 8/00*    (2006.01)

(52) U.S. Cl.
CPC ......... *G02B 6/0038* (2013.01); *G02B 6/0016* (2013.01)

(58) Field of Classification Search
None
See application file for complete search history.

(56) References Cited

U.S. PATENT DOCUMENTS

2003/0231394 A1* 12/2003 Kimura ................. G09F 13/16
                                                                                                        359/558
2011/0051041 A1    3/2011   Yashiro
(Continued)

FOREIGN PATENT DOCUMENTS

WO    WO2008081070 A1    7/2008
WO    WO2009076395 A1    6/2009
(Continued)

OTHER PUBLICATIONS

David: "Fabrication of stair-case profiles with high aspect ratios for blazed diffractive optical elements", Microelectronic Engineering, Jun. 2000 vol. 53 Issues 1-4, pp. 677-680.
(Continued)

*Primary Examiner* — Chad H Smith
(74) *Attorney, Agent, or Firm* — Laine IP Oy (57) ABSTRACT

The invention relates to a diffractive optical grating and applications thereof. The grating comprises a first zone and a second zone each having a two-dimensionally periodic grating structure having a first period ($d_x$) in a first direction, the first period being chosen to allow for diffraction of selected wavelengths of visible light along the first direction, and a second period ($d_y$) in a second direction different from the first direction, the second period ($d_y$) being short enough to prevent diffraction of said selected wavelengths along the second direction. According to the invention, the grating structures in the first zone and in the second zone have different modulation characteristics in said second direction for producing different diffraction efficiencies for the first and second zones. The invention provides a new design parameter, sub-wavelength modulation, for assisting in local adjustment of diffraction efficiency of gratings in particular in display applications.

20 Claims, 5 Drawing Sheets

(56) References Cited

U.S. PATENT DOCUMENTS

| | | |
|---|---|---|
| 2012/0002280 A1 | 1/2012 | Hirai et al. |
| 2015/0234477 A1 | 8/2015 | Abovitz et al. |
| 2016/0231570 A1 | 8/2016 | Levola et al. |
| 2017/0102543 A1 | 4/2017 | Vallius |
| 2017/0299793 A1* | 10/2017 | Fattal ................... G02B 5/1828 |

FOREIGN PATENT DOCUMENTS

| | | |
|---|---|---|
| WO | WO2014044912 A1 | 3/2014 |
| WO | WO2016111709 A1 | 7/2016 |
| WO | WO2017039820 A1 | 3/2017 |

OTHER PUBLICATIONS

Kipfer et a: Subwavelength structures and their use in diffractive optics. Optical Engineering, Soc. of Photo-Optical Instrumentation Engineers, Mar. 1, 1996, vol. 35, No. 3, pp. 726-731.

* cited by examiner

DIFFRACTIVE GRATING WITH VARIABLE DIFFRACTION EFFICIENCY AND METHOD FOR DISPLAYING AN IMAGE

FIELD OF THE INVENTION

The invention relates to diffractive gratings, and in particular their use in display technology. Specifically, the invention relates to a diffraction efficiency-modulated grating, optical devices utilizing such grating and a method for displaying an image on a diffractive display, and a novel use.

BACKGROUND OF THE INVENTION

Near-to-eye displays (NEDs) and head-up displays (HUDs) typically involve diffractive gratings to produce a viewable image. Gratings are needed as in-coupling gratings, which couple an image from an image source to a waveguide, as out-coupling gratings, which produce the final viewable image for the user, and as exit pupil expanders (EPEs), which increase the size of the displays exit pupil.

The quality and characteristics of the gratings determine the quality of resulting image. In addition to having distinct and consistent grating lines, in advanced applications it is desirable to be able to control the diffraction efficiency of the grating locally. This can be achieved by varying grating line height or fill factor within the grating, i.e. using height or fill factor modulation. To achieve the largest possible efficiency adjustment range, both height and fill factor should be modulated.

Fabrication of height modulated elements is generally done by repeating fabrication cycles in which one height is defined within one cycle. In particular, fabrication of micro- and nanostructures with varying heights on a same substrate is difficult especially in the case of inorganic materials that are difficult to process. This generally requires several fabrication cycles with alignment, where each element height is defined separately during one cycle. This also requires highly optimized and often complicated processing of the material. In order to get vertical side walls in the material, highly anisotropic etching is required in the currently available methods. One known processing method is discussed in C. David, "*Fabrication of stair-case profiles with high aspect ratios for blazed diffractive optical elements*", Microelectronic Engineering, 53 (2000). Because of the complexity of the method, the yield of this process is low. Moreover, overlay exposure requires lateral placement accuracy in nanometer level, and any deviations from optimal causes losses in optical performance. Typically overlay exposure has an accuracy of ~10 nm, which causes significant deviations to optimal optical performance. Accurate height modulation is by itself challenging and particular challenges are faced when both height modulation and fill factor modulation are desired in order to achieve maximum efficiency adjustment range.

The need of height modulation, however, increases the fabrication complexity especially in the case of high refractive index materials, such as oxides. There are few methods available that suit for mass production.

Thus, there is a need for improvements for adjusting the diffraction efficiency.

SUMMARY OF THE INVENTION

It is an aim of the invention to solve at least some of the abovementioned problems and to provide novel means to modulate the diffraction efficiency of gratings. A specific goal is to provide an additional design parameter suitable for optimizing the optical performance of optical systems.

One specific aim is to tackle the difficulty of height modulation and to provide an additional design parameter to replace or to be used together with height modulation to affect diffraction efficiency and a novel devices and methods taking advantage of the design parameter.

According to one aspect, the invention is based on providing in a diffractive grating a two-dimensional grating period, where one of the two perpendicular grating periods is large enough to generate diffraction while the other grating period is sub-wavelength, and can be applied for efficiency modulation. In particular, the spacing between adjacent structures, i.e. fill factor modulation, in this direction can be used to modulate the diffraction efficiency.

In more detail, the present diffractive optical grating comprises a first zone and a second zone each having a two-dimensionally periodic grating structure. Each of the zones comprises a first period in a first direction, the first period being chosen to allow for diffraction of selected wavelengths of visible light along the first direction, and a second period in a second direction different from the first direction, the second period being short enough to prevent diffraction of said selected wavelengths along the second direction. According to the invention, the grating structures in the first zone and in the second zone have different modulation characteristics in the second direction. This kind of sub-wavelength modulation produces different diffraction efficiencies for the first and second zones for light diffracting in the first direction.

The present diffractive waveguide comprises an essentially planar substrate capable of acting an optical waveguide, i.e. a lightguide, and at least one diffractive grating of the kind described above arranged within or onto the substrate and being capable of coupling light into the substrate, within the substrate, or out of the substrate.

The present diffractive display device comprises an image source capable of presenting an image and a diffractive waveguide comprising an in-coupling grating, an out-coupling grating, and/or an exit pupil expander grating of the kind described above configured to reproduce the image presented by the image source. In particular, the image source has an output wavelength or wavelength range and the second period of the grating is in the sub-wavelength region of the image source for preventing diffraction in the second direction.

The present method for displaying an image on a diffractive display comprising a diffractive grating of the kind described above, the method comprises directing light to a first zone of the grating for causing optical interference with a first diffraction efficiency, and directing light to a second zone of the grating for causing optical interference with a second diffraction efficiency different from the first diffraction efficiency at least partly due to the different sub-wavelength modulation characteristics of the first and second zones.

The invention also concerns a use of sub-wavelength period patterning of a grating having a first direction, in which the diffraction occurs, in a second direction, which is non-parallel with respect to the first direction for adjusting the diffraction efficiency of the grating. In particular, the sub-wavelength period patterning can be combined with fill factor modulation of the grating in the secondary direction.

In particular, the invention is characterized by what is stated in the independent claims.

The invention offers significant benefits. First, the invention allows for a large modulation capability of diffraction efficiency without the need of height modulation of the structures that is generally regarded very challenging. In particular the invention allows, even without height modulation, for achieving diffraction efficiency adjustment range, which is similar to that previously achieved using simultaneous fill factor and height modulation in the primary diffraction direction. Thus, the invention can be used to remove the tedious need of grating height adjustment and replaces it by a sub-wavelength modulation in a fill factor for example in the perpendicular direction of the primary grating direction grating.

By providing a completely new design option having an effect on the diffraction efficiency, the invention addresses the need for design parameters for diffractive gratings in which the diffraction efficiency can be freely adjusted. The new design parameter, sub-wavelength modulation, assists in adjusting the diffraction efficiency locally in particular in display applications. Applied e.g. in an in-coupling grating, exit pupil expander and/or out-coupling grating of a diffractive NED or HUD, the color balance, image uniformity and/or efficiency (brightness) of the resulting image can be optimized.

The invention is applicable for mass production, since there are manufacturing technologies available per se that readily suit for producing structures with optical sub-wavelength resolution. As concerns the ability to manufacture, a particularly advantageous embodiment is one where the modulation at least in the second direction is pure fill factor modulation, i.e., free from height modulation.

The invention harnesses the second lateral dimension of a grating to serve for modulating diffraction efficiency in the first lateral dimension. Despite periodicity in both these directions, the grating still remains a one-dimensional grating for the selected wavelength or wavelength range. The impact of variation of modulation characteristics in the second direction is illustrated by way of an example later. Basically, tuning range from zero to the maximum diffraction efficiency (with chosen grating parameters in the first direction) is achievable.

The dependent claims are directed to selected embodiments of the invention.

In some embodiments, the first zone and the second zone have different fill factor modulation characteristics in said second direction. In some embodiments, this is the only modulation method used in the second direction, which makes the manufacturing process simpler, because no local modification of height is needed. However, it is not excluded that the first zone and the second zone have, in addition to or instead of fill factor modulation, different height modulation characteristics in the second direction.

In some embodiments, the first zone and the second zone have the same periods in the first direction and/or the second direction, i.e. there is no period modulation in one or both of these directions. However, it is not excluded that the first zone and the second zone have different periods in the first direction and/or said second direction.

In some embodiments, the grating structures are at least partly made of material having an index of refraction higher than 1.7, such as higher than 2.0, the material preferably being an oxide material, such as a metal oxide or nitride, for example $TiO_2$, $SiO_2$, $Si_3N_4$ or $HfO_2$. These materials allow for producing high quality gratings on high refractive index substrates.

In some embodiments, the grating structures of the first and the second zone comprise pillars, such as pillars having a rectangular, elliptical or oval cross-sectional shape in a lateral plane of the grating. In some embodiments, the pillars have a flat or slanted tops.

In some embodiments, the first period is longer than an optical diffraction threshold value and the second period is shorter than said optical diffraction threshold value, said optical diffraction threshold value being selected for example from the range of 100-700 nm.

In some embodiments, the first and second zones each have a lateral area that is at least 0.001 $mm^2$, such as 0.01 $mm^2$ to 100 $mm^2$.

The number of zones that have different modulation characteristics in the second direction, at least compared with their neighboring zones, or even all other zones, can be e.g. 2-1000, such as 3-1000, for example 10-100 in a single grating.

Next, embodiments of the invention and advantages thereof are discussed in more details with reference to the attached drawings.

DETAILED DESCRIPTION OF EMBODIMENTS

Definitions

"First direction" and "primary direction" refer to the direction of the grating in which the actual diffraction takes place in the particular zone concerned, i.e. the direction in which the grating pattern periodicity is in the optical diffractive range.

"Second direction" and "secondary direction" refer to the sub-wavelength periodicity direction of the grating pattern used for diffraction efficiency modulation.

"Lateral" and "in-plane" refer to the plane defined by the first direction and the second direction. Typically, this corresponds to the plane of a planar substrate the grating is manufactured on. "Normal" direction refers to the direction perpendicular to the lateral plane.

The term "zone" (like in "first zone" and "second zone") refers to a region of the grating in the lateral plane, the region having the characteristics, in particular sub-wavelength modulation characteristics, referred to in each case. Typically, the zones are discrete, whereby the modulation characteristics are constant within each region and change step-wise at the region boundary. However, also e.g. continuously modulated gratings are within the scope of the invention.

The term "fill factor" refers to the proportion of grating structure material to surrounding material (e.g. air or other solid material with different index of refraction) within a grating period. In the typical case of rectangular grating lines, this equals to the proportion of line width to period width. Consequently, "fill factor modulation" refers to variation of fill factor in the lateral dimensions of the grating, i.e. between periods of the periodic structure.

Likewise, "height modulation" refers to variation of the height of building blocks of the grating in the normal direction of the grating. For example, in the case of an array of pillars, element height is the distance in the normal direction between the top of a line (pillar top) and neighboring pit (valley bottom).

"Modulation characteristics" refer in general to any geometric property of the grating affecting fill factor modulation or height modulation, and consequently the diffraction efficiency.

"Sub-wavelength" periodic structure refers to a structure with short enough elementary dimensions to prevent diffraction to propagating diffraction orders, in particular the first diffraction order, such as the first transmission order, of wavelengths used in the particular application, such as all visible light wavelengths. Sub-wavelength modulation correspondingly refers to modulation of a sub-wavelength periodic structure.

Description of Selected Embodiments

Figure 1:
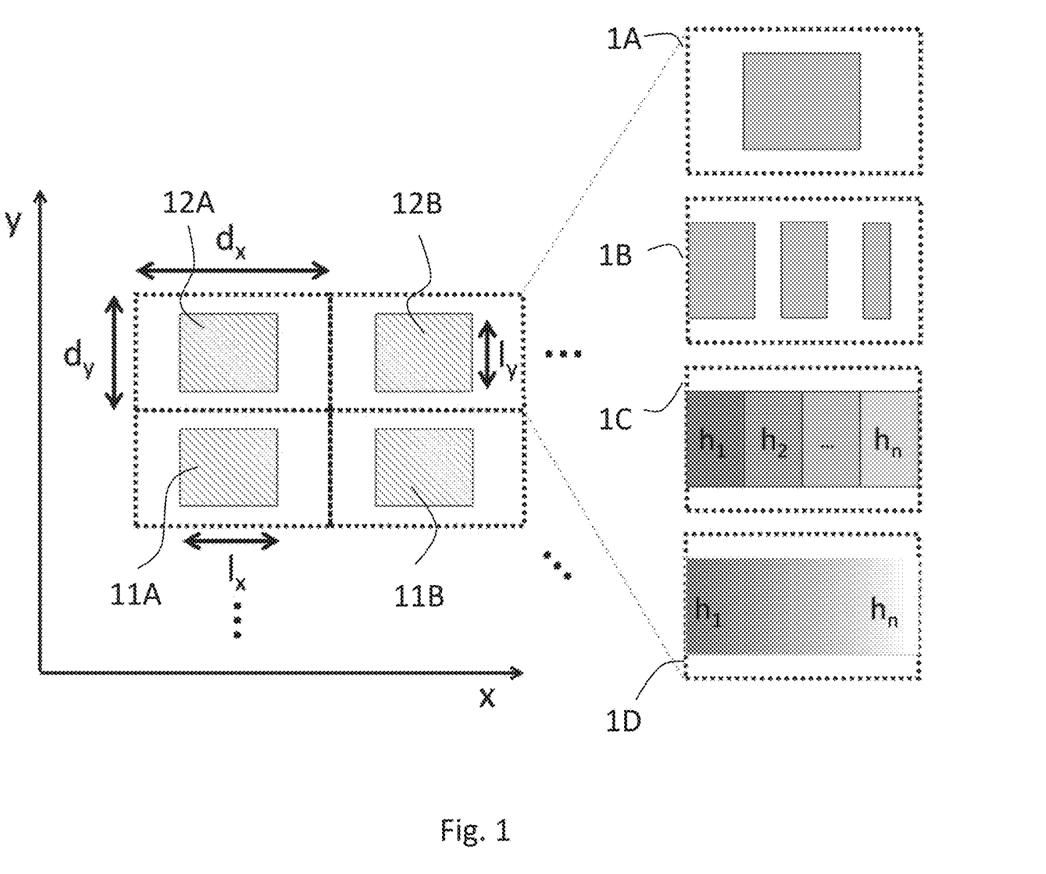
FIG. 1 shows a schematic representation of the grating geometry used for efficiency modulation according to some embodiments of the invention.

FIG. 1 illustrates a sub-wavelength modulated grating in orthogonal geometry. The grating comprises in lateral plane thereof a plurality of unit cells (dotted boundaries) arranged in rows in the x-direction and columns in the y-direction. The grating has two periods $d_x$ and $d_y$ in the perpendicular directions, the periods defining the unit cell size. The period in the first direction (in this case period $d_x$ in the x-direction) is chosen such that diffraction occurs in this direction. The period in the second direction ($d_y$ in the y-direction) is chosen to be so small that no propagating diffraction orders in that direction are present.

Each unit cell comprises a building block, i.e., a grating feature 11A, 11B, 12A, 12B, having a lateral size of $l_x$ and $l_y$, in the x- and y-directions, respectively. The fill factor in the x-direction is $f_x=l_x/d_x$ and in the y-direction $f_y=l_y/d_y$. The fill factor $f_y$ can, in accordance with the principle of the present invention, used for efficiency modulation.

It should be noted that choosing $f_y=1$ results in a traditional one-dimensional grating, i.e, a grating with continuous grating lines in the y-direction. Some zones of the grating may indeed have $f_y=1$, whereas at least some other zone, typically a plurality of other zones, has $f_y<1$.

The building blocks of the grating, i.e. grating features 11A, 11B, 12A, 12B, may have any desired geometry. As shown in the right hand side of FIG. 1, the building block may be e.g.
- rectangular pillar with constant height (binary pillars), shown in exemplary unit cell 1A,
- several rectangular binary pillars, optionally with different widths and/or heights, as shown in unit cell 1B,
- several pillars or connected sections with different heights $h_n$ (discrete height pillar(s)), as shown in unit cell 1C,
- one or more sections with a height gradient (continuously varying height), as shown in unit cell 1D, or
- any possible combination of these.

Also, the lateral shape of the pillar or any sub-pillar can deviate from a rectangular one. Other typical shapes include circular, elliptical and triangular shapes, but the shape can be nearly arbitrary.

Following the principle described above, the diffraction efficiency of any one-dimensional grating (e.g. binary, blazed, slanted, multilayer grating) can be modulated by varying the areal in-plane shape of the grating structure inside the grating unit cell. The unit cell size in the second direction needs to be so small that no diffraction orders in the second direction are present. This extends the adjusting range of efficiency modulation.

What is notable is that for wavelengths longer than the unit cell size in the second direction, the grating appears as a one-dimensional grating, i.e, there is no diffractive coupling in the second direction.

It should be noted that instead of orthogonal geometry, where the first and second directions deviate by 90 degrees, the second direction along which the sub-wavelength modulation takes place can be at any other inclined angle with respect to the first direction.

Figure 2A:
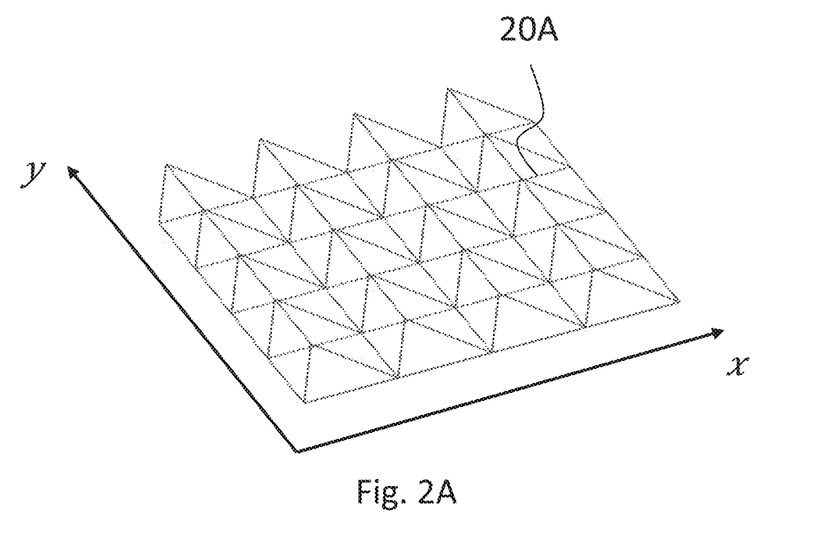
FIG. 2A shows a traditional one-dimensional blazed grating that is represented as a two-dimensional grating with the fill factor of 1 in the y-direction.
Figure 2B:
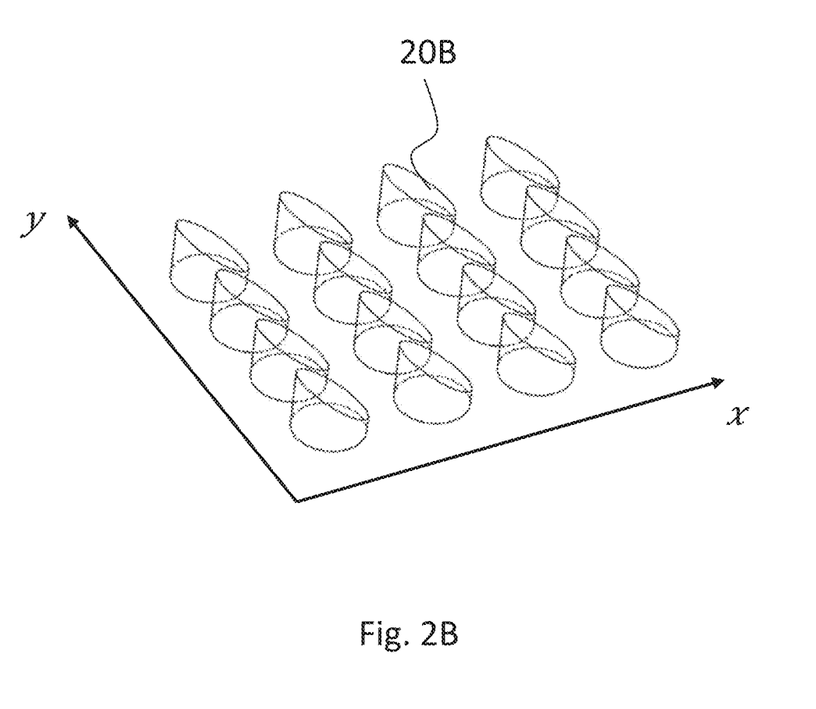
FIG. 2B shows a blazed grating with diffraction efficiency being modified by decreasing the size of the grating area in each 2D grating cell according to one embodiment of the invention. The remaining structure inside a unit cell has a circular in-plane shape.

FIGS. 2A and 2B show an example, in which the diffraction efficiency of a conventional blazed grating (FIG. 2A) has been modified by decreasing the size of the grating structure inside the unit cell (FIG. 2B). The remaining structure inside the unit cell has a circular in-plane shape. In FIG. 2A, the grating lines are continuous lines along the second direction (fill factor=1), although for illustration purposes the imaginary unit cells are shown therein. It should be noted that the grating of FIG. 2B is still a one-dimensional grating for wavelengths higher than the period determined by the second dimension of the unit cell, but its diffraction efficiency is modified by decreasing the size of the grating area in each unit cell.

The material of the grating structure may be organic or inorganic transparent material. According to one embodiment, an organic material, in particular a metal compound, such as metal oxide or metal nitride is used. In particular, the final material may comprise material whose index of refraction is 2.0 more, such as 2.2 or more. The material can be for example $TiO_2$, $SiO_2$, $Si_3N_4$ or $HfO_2$.

The substrate the grating structure is manufactured on is preferably optically transparent, such as a glass substrate or polymer substrate. Transparent herein means transmittance higher than 50%, in particular higher than 95%. For display applications it preferred that the substrate is planar and capable of serving as a waveguide for visible optical wavelengths, i.e. allowing them to propagate within the substrate via total internal reflections.

In typical embodiments, the grating structure material has an index of refraction higher than that of the substrate material. This allows for the light travelling in the substrate via total internal reflections to exit the substrate at the location of the grating and the diffraction to take place. For example the, index of refraction of the substrate can be less than 2.0 and the index of refraction of the grating material more than 2.0.

The period of the grating is typically 10 μm or less, in particular 1 μm or less, such as 200-800 nm in the first direction, whereas in the second direction it is shorter than that. It should be noted that in addition to constant-period gratings the present invention can be used in connection with gratings whose period is modulated in either direction. That is, the period does need to be constant in the lateral dimension of the grating.

If needed, the grating can be embedded in an optical structure, i.e. covered or coated with one or more additional layers.

The present invention can be used to manufacture gratings for display applications, such as wearable display applications, for example virtual reality or augmented reality glasses. The diffractive grating may be e.g. an out-coupling grating, an in-coupling grating or an exit pupil expander (EPE) of a near-to-eye display (NED) or head-up display (HUD).

In particular in display applications, the area of the grating pattern manufactured is typically at least 1 cm$^2$, such as 2-500 cm$^2$. The number of zones with different diffraction efficiencies achieved using the presently discussed method can be e.g. 2-1000, such as 2-100, but can be even higher. It is also possible that the zones are not discrete, but the sub-wavelength modulation of the grating is continuously changed along the second direction.

Figure 3:
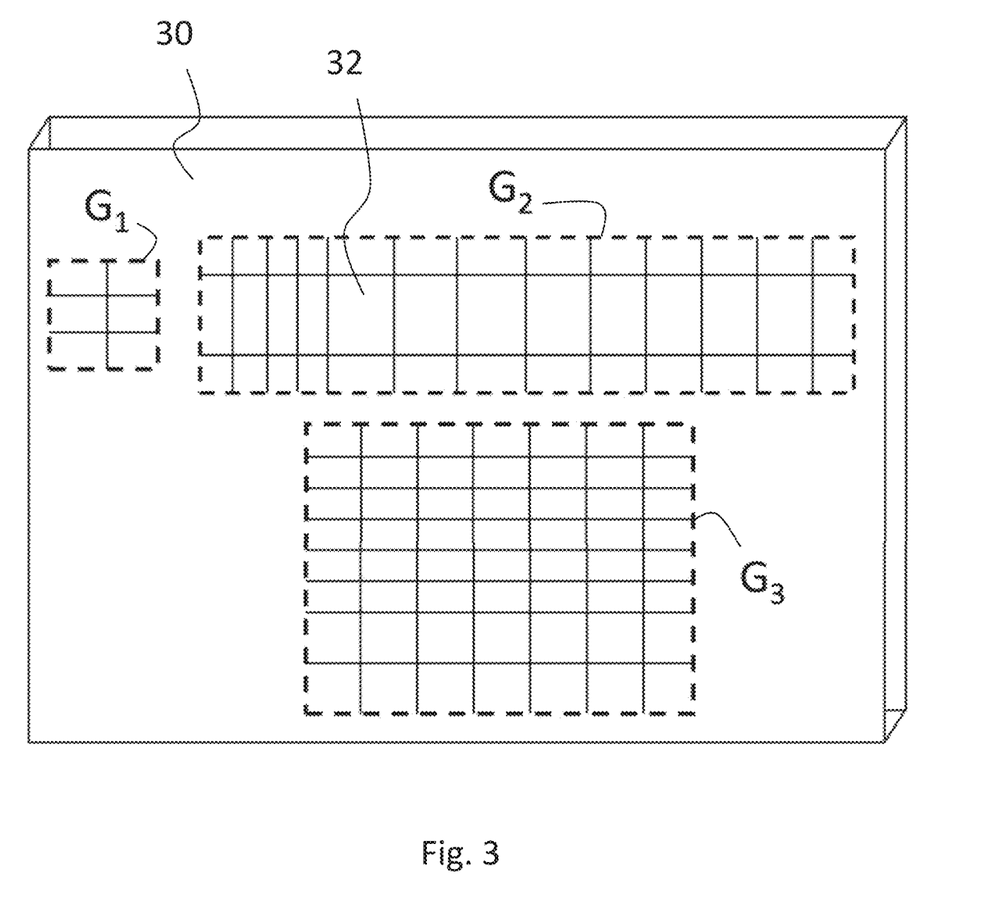
FIG. 3 illustrates a diffractive NED lightguide with a pixelated in-coupling ($G_1$), exit pupil expansion ($G_2$) and out-coupling ($G_3$) grating.

It should also be noted that this invention can be used to modulate the efficiency of each grating locally as a function of the grating position in either one or both lateral directions within a single device. For example, FIG. 3 shows a light guide 30 with three grating areas $G_1$, $G_2$, $G_3$ on its top surface: in-coupler $G_1$, horizontal exit pupil expander $G_2$, and out-coupler $G_3$. This kind of design is suitable for NEDs, for example. Each of these grating areas is divided into a plurality of rectangular zones 32, i.e., "pixels", typically having lateral dimensions from tens of micrometers, such as 20 μm, to several millimeters, such as 10 mm. The pixels can have also other shape, e.g. triangular or polygonal. Pixel size can vary locally. Each grating area $G_1$, $G_2$, $G_3$ has an own basic grating shape but areal size inside the grating unit cell varies from a pixel to pixel. The local areal fill factor and in-plane fill shape are optimized for each pixel to obtain a NED display with sufficient color balance, image uniformity and efficiency over the eyebox. Naturally, it is also possible to provide only one or two of the grating areas $G_1$, $G_2$, $G_3$ with the present sub-wavelength modulation zone technology.

Figure 4A:
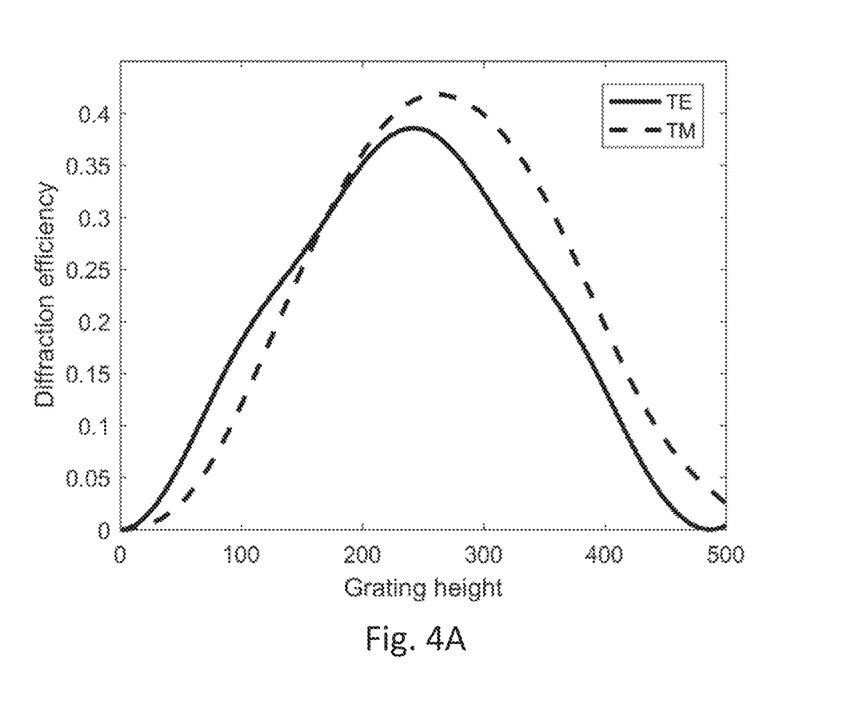
FIG. 4A shows an example how diffraction efficiency of the first transmission order of a binary 1D grating changes as a function of the grating height.
Figure 4B:
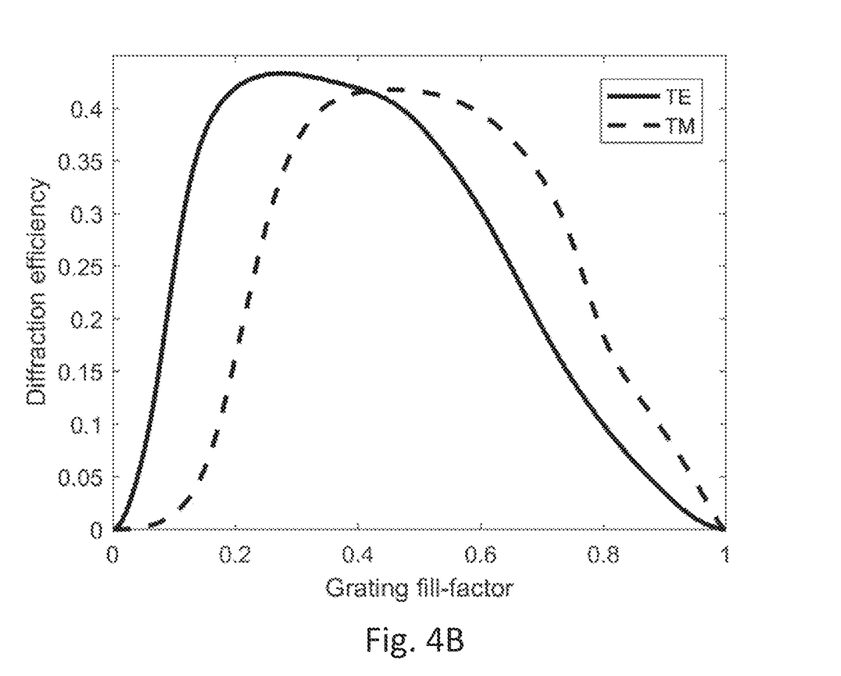
FIG. 4B shows an example how diffraction efficiency of the first transmission order of a 1D grating changes as a function of the grating fill-factor.
Figure 5:
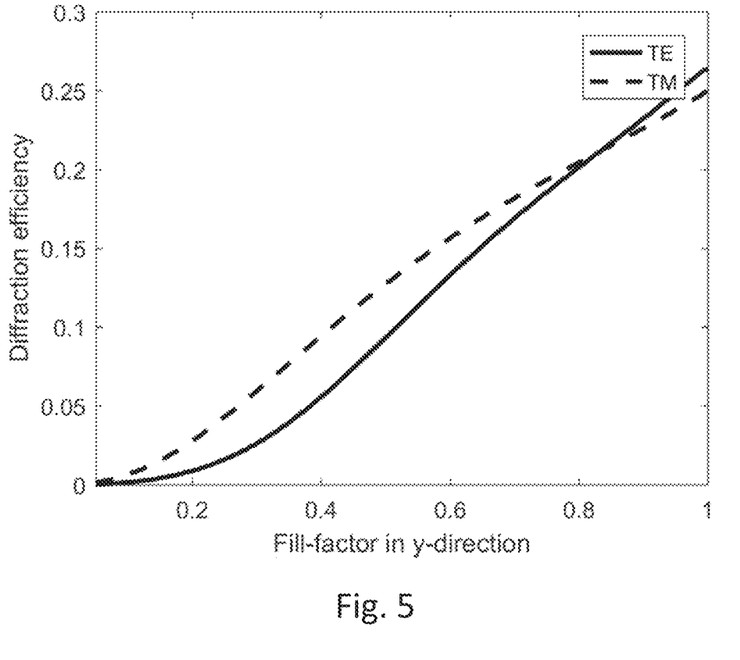
FIG. 5 shows how diffraction efficiency of the first transmission order of a 1D binary grating that is represented as two-dimensional grating with a sub-wavelength period in the y-direction changes as a function of the fill-factor in the y-direction.

FIGS. 4A and 4B show how the diffraction efficiency of the first transmission order of a dielectric binary grating can be modulated using height and fill-factor modulation. Numerical results were obtained with the Fourier modal method (also known as rigorous coupled wave analysis). The binary grating resides on an interface between air and a glass substrate having refractive index of 2.0, the grating period is 500 nm, fill factor 0.5, and the grating is made of the same material as the substrate. The grating is illuminated with a plane wave with 450 nm free space wavelength at normal incidence. Results are shown for both transverse electric (TE) and transverse magnetic polarizations (TM). In FIG. 4A, the grating fill factor is 0.5 and in FIG. 4B, the grating height is 250 nm. FIG. 5 shows for comparison how the diffraction efficiency can be modulated with fill-factor modulation in y-direction (secondary, i.e. sub-wavelength direction), when the grating height and fill factor in the x-direction (primary direction) are fixed to 150 nm and 0.5, respectively. The grating period in the y-direction is 200 nm.

FIGS. 4A and 4B show that height modulation and fill factor modulation in general have a great effect on the diffraction efficiency. FIG. 5 on the other hand shows that for a given grating parameters, the present sub-wavelength modulation scheme offers the possibility to tune the diffraction efficiency within the wide range from zero to the maximum efficiency achievable using the parameters given. One advantage of sub-wavelength modulation is the rather linear behavior of the diffraction efficiency as a function of the sub-wavelength fill factor, compared e.g. with tuning using simultaneous fill factor and height modulation in the primary direction.

CITATIONS LIST

Non-Patent Literature

C. David, "Fabrication of stair-case profiles with high aspect ratios for blazed diffractive optical elements", Microelectronic Engineering, 53 (2000).

The invention claimed is:

1. A diffractive optical grating comprising a first zone and a second zone each having a grating structure which are two-dimensionally periodic and defining a unit cell size in each grating, wherein:
   a first period ($d_x$) of unit cells in a first direction being chosen to allow for diffraction of selected wavelengths of visible light along the first direction, and
   a second period ($d_y$) of said unit cells in a second direction different from the first direction, short enough to prevent diffraction of said selected wavelengths along the second direction,
wherein the grating structures in the first zone and in the second zone have different modulation characteristics in said second direction for producing different diffraction efficiencies for the first and second zones.

2. The grating according to claim 1, wherein the first zone and the second zone have different fill factor modulation characteristics in said second direction.

3. The grating according to claim 1, wherein the first zone and the second zone have different height modulation characteristics in said second direction.

4. The grating according to claim 2, wherein there is no height modulation between the first zone and the second zone in said second direction.

5. The grating according to claim 1, wherein the first zone and the second zone have different periods in said first direction and/or said second direction.

6. The grating according to claim 1, wherein the first zone and the second zone have the same periods in said first direction and/or said second direction.

7. The grating according to claim 1, wherein grating structures are at least partly made of material having an index of refraction higher than 1.7, such as higher than 2.0, the material preferably being an oxide material, such as a metal oxide or nitride, for example $TiO_2$, $SiO_2$, $Si_3N_4$ or $HfO_2$.

8. The grating according to claim 1, wherein the grating structures of the first and the second zone comprise pillars, such as pillars having a rectangular, elliptical or oval cross-sectional shape in a lateral plane of the grating.

9. The grating according to claim 8, wherein the pillars have flat or slanted tops.

10. The grating according to claim 1, wherein the first period ($d_x$) is longer than an optical diffraction threshold value and the second period ($d_y$) is shorter than said optical diffraction threshold value.

11. The grating according to claim 1, comprising at least three such zones having different modulation characteristics in said second direction compared with their neighboring zones or all other zones.

12. The grating according to claim 1, wherein the zones are arranged in a regular grid, such as a rectangular grid.

13. The grating according to claim 1, wherein the first and second directions are orthogonal to each other.

14. A diffractive waveguide comprising an essentially planar substrate capable of acting as an optical waveguide and at least one diffractive grating arranged within or onto the substrate and being capable of coupling light into the substrate, within the substrate, or out of the substrate, wherein the diffractive grating is a grating according to claim 1.

15. A diffractive display device comprising an image source capable of presenting an image and a diffractive waveguide comprising an in-coupling grating, an out-coupling grating, and/or an exit pupil expander grating configured to reproduce the image presented by the image source, wherein said in-coupling grating, out-coupling grating, and/or exit pupil expander grating comprises a diffractive grating according to claim 1.

16. The diffractive display device according to claim 15, wherein image source has an output wavelength or wavelength range and the second period ($d_y$) of the grating is in the sub-wavelength region of the image source for preventing diffraction in said second direction.

17. A method for displaying an image on a diffractive display comprising a diffractive grating, the method comprising:
    directing light to a first zone of said grating for causing optical interference with a first diffraction efficiency, and
    directing light to a second zone of said grating for causing optical interference with a second diffraction efficiency,
wherein a diffractive grating according to claim 1 is used as said diffractive grating.

18. The grating according to claim 10 wherein said optical diffraction threshold value is within a range of 100-700 nm.

19. The grating according to claim 1, comprising 3-1000 zones.

20. The grating according to claim 11, wherein the area of each zone is at least 0.001 mm$^2$.

\* \* \* \* \*